Patented July 20, 1937

2,087,337

UNITED STATES PATENT OFFICE 2,087,337

ADHESIVE

William J. Tomsicek, St. Paul, Minn., Lloyd L. Dodge, Rhinelander, Wis., and Jose B. Calva, St. Paul, Minn.; said Tomsicek and said Calva assignors, by direct and mesne assignments of their right to Dodge Chemical and Manufacturing Company, Chicago, Ill., a corporation of Delaware No Drawing. Application August 15, 1934, Serial No. 739,926

6 Claims. (Cl. 134—23.6)

Our invention relates to an improvement in adhesives, which are particularly adapted for use in binding cellulosic materials and papers which have or have not been previously coated with waxes, resins, mixtures of waxes and resins, lacquers, varnishes, and the like.

It is the object of our invention to provide an adhesive particularly designed for use in binding sheets of cellulosic materials and papers coated as above, in which chlorinated rubber is combined with waxes and resins to produce the desired results. Due to the content of waxes, resins and other ingredients of the mixture necessary, the percentage of chlorinated rubber ordinarily does not exceed eighteen per cent. Other adhesives have been used previously containing chlorinated rubber in greater proportions, but for our use such greater proportions are not required due to the presence of waxes, resins and other ingredients.

It is our invention to provide an adhesive in which the percentage of the ingredients vary substantially as follows:

|  | Percent |
|---|---|
| Chlorinated rubber | 2 to 18 |
| Resins | 40 to 80 |
| Plasticizers | 1 to 20 |
| Waxes | 0 to 30 |
| Solvent | 25 to 50 |

In the above composition, by the term chlorinated rubber, we mean stable commercial products containing from 50% to 70% chlorine such as the commercially known product Tornesit.

By resins, we mean natural and synthetic materials such as gum thus, copal, dammar, kauri, mastic and the like; ester gum, chlorinated aromatic hydrocarbons such as chlorinated biphenyl, polymerized terpenes, modified phenol-formaldehyde resins such as the amberols, albertols, bakesite, paranol, and resinous and waxy metallic substances such as the metallic derivatives of organic acids such as abietic, stearic and the like.

By plasticizers, we mean natural and synthetic esters such as palmitin, olein, cotton seed oil, castor oil, sperm oil together with its products, etc.; the phthalates of the alkyls containing up to five carbon atoms in their molecule such as diethyl, propyl, isopropyl, butyl and its metamers, amyl and its metameric phthalates, the phosphates of cresyls, the tartrate of butyl and amyl, the abietates of methyl ethyl and butyl, the hydrogenated abietates of ethyl methyl and butyl, and the like.

By waxes, we mean natural waxes such as japan wax, ceresin, beeswax, and synthetic waxes such as Rilan, as well as waxy substances such as stearyl alcohol, stearic acid and the like.

The solvent which we use may be any type of substance capable of dissolving the mixture of the ingredients, such as aromatic hydrocarbons such as benzene, toluene, xylene and the like; halogenated aliphatic hydrocarbons such as dichloroethane and its derivatives such as chlorhydrin, and the like; carbon tetrachloride, carbon-disulphide and similar substances.

An explanation as to the general composition of the adhesive having been made, a specific example of the manner in which the ingredients are combined is shown in the following formula:

|  | Percent |
|---|---|
| Tornesit | 10 |
| Ester gum | 30 |
| Arochlor 1262 | 15 |
| Hercolyn | 7 |
| Carbon disulphide | 38 |

In the above exemplification, tornesit is chlorinated rubber which is available commercially. Ester gum is the glyceryl ester of abietic acid. Arochlor 1262 is a chlorinated biphenyl. Hercolyn is the hydrogenated methyl ester of abietic acid.

It is understood that the stated example is only used for the purposes of illustration, and that various other combinations of the ingredients as outlined in the general formula may be used within the limits stated. It will be noted that the percentage of chlorinated rubber in the formula is substantially less than the amount previously used in any such adhesive with which we are familiar. The increased resin, wax and plasticizer content is responsible for the result obtained.

With our adhesive, cellulosic sheets and papers having or not having a waxy, lacquered or varnished surface, or having a coating of resin or a mixture of resins and waxes, or substances of resinous and waxy characteristics such as the metallic salts of acids like abietic and stearic, are readily adhered together.

In accordance with the patent statutes, we have described the composition of our adhesive, and while we have endeavored to set forth the best embodiment thereof, we desire to have it understood that this is only illustrative of a means of carrying out our invention, and the composition may be changed within the scope of the following claims without departing from the spirit of the invention:

We claim:

1. An adhesive including from 2% to 18% chlorinated rubber, from 40% to 80% resins, from 1% to 20% plasticizers, and from 1% to 30% waxes.

2. An adhesive dissolved in a solvent material including from 2% to 18% chlorinated rubber, from 40% to 80% resins, from 1% to 20% plasticizers, from 1% to 30% waxes, and from 25% to 50% solvent.

3. An adhesive including substantially chlorinated rubber, 10%; ester gum, 30%; arochlor 1262, 15%; hercolyn, 7%; and a suitable solvent, 38%.

4. An adhesive including chlorinated rubber, 2% to 18%; ester gum, 40% to 80%; plasticizers from 1% to 20%; waxes, 1% to 30%, and from 25% to 50% solvent.

5. An adhesive including chlorinated rubber, 2% to 18%; ester gum, 40% to 80%; plasticizers, 1% to 20%; and waxes, 1% to 30%.

6. An adhesive including from 2% to 18% chlorinated rubber, from 40% to 80% resin, from 1% to 20% plasticizers, and from 1% to 30% wax-material.

WILLIAM J. TOMSICEK.
LLOYD L. DODGE.
JOSE B. CALVA.